(12) United States Patent
Alabdulhai et al.

(10) Patent No.: US 12,729,996 B2
(45) Date of Patent: Sep. 8, 2026

(54) VALIDATING PERFORMANCE OF A BI-DIRECTIONAL PROVER

(71) Applicant: Saudi Arabian Oil Company, Dhahran (SA)

(72) Inventors: Abdullah A. Alabdulhai, Al Qatif (SA); Ali A. Alqahtani, Dammam (SA); Mishal D. Alsaleh, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 348 days.

(21) Appl. No.: 18/432,713

(22) Filed: Feb. 5, 2024

(65) Prior Publication Data

US 2025/0251272 A1 Aug. 7, 2025

(51) Int. Cl.
*G01F 25/10* (2022.01)

(52) U.S. Cl.
CPC .................................... *G01F 25/11* (2022.01)

(58) Field of Classification Search
CPC ........ G01F 25/11; G01F 25/10; G01F 15/022; G01F 15/024; G01F 15/003; E21B 49/0875; E21B 47/07; E21B 21/082
See application file for complete search history.

(56) References Cited

U.S. PATENT DOCUMENTS 3,423,988 A 1/1969 Grove et al.
3,472,280 A * 10/1969 Van Scoy ............... F16K 11/08 15/104.062
3,580,045 A * 5/1971 Pfrehm ................... G01F 25/11 228/2.1
3,668,923 A * 6/1972 Grove ..................... G01F 25/11 73/1.17
3,817,268 A * 6/1974 Kirkwood ............... F16L 55/46 15/104.062
3,911,724 A * 10/1975 Grove ..................... G01F 25/11 73/1.17
4,106,328 A * 8/1978 Neeff ...................... G01F 25/11 280/433
4,297,894 A * 11/1981 Nagaishi ................. G01F 15/04 73/861.03
4,606,218 A * 8/1986 Chisman, III .......... G01F 25/11 73/239

(Continued)

*Primary Examiner* — Tran M. Tran
(74) *Attorney, Agent, or Firm* — Fish & Richardson P.C.

(57) ABSTRACT

A bi-directional prover validation system includes a bi-directional prover that includes a calibration section and a launch section fluidly coupled to a fluid flow system that circulates a process fluid and configured to bi-directionally move a displacer through the fluid conduit. The bi-directional prover validation system includes a temperature sensor; a pressure sensor; a densometer; and a control system. The control system is configured to perform operations including identifying parameters associated with the bi-directional prover; identifying measurements from the temperature sensor, the pressure sensor, and the densometer; based on the identified measurements and the identified parameters, calculating an outlet pressure of the process fluid at the fluid outlet; comparing the calculated outlet pressure to a measured outlet pressure of the process fluid at the fluid outlet; and based on the comparison meeting a threshold, validating the bi-directional prover.

30 Claims, 3 Drawing Sheets

(56) References Cited

U.S. PATENT DOCUMENTS 5,392,632 A * 2/1995 Umeda .................. G01F 25/11 73/239
6,360,579 B1 * 3/2002 De Boom .............. G01F 25/13 73/1.35
6,629,447 B1 * 10/2003 Collins .................. G01F 25/10 73/1.16
7,086,113 B2 8/2006 Young
7,480,577 B1 * 1/2009 Feller ..................... G01F 1/667 702/45
8,161,791 B2 * 4/2012 Ignatian ................. G01F 25/11 73/1.19
8,370,098 B2 * 2/2013 Hocker ................. G01F 15/022 702/50
8,505,355 B2 8/2013 Rudroff
8,739,597 B2 * 6/2014 Day ........................ G01F 25/17 73/1.22
9,134,155 B2 * 9/2015 Ramsay .................. G01F 25/10
9,476,741 B2 * 10/2016 Hollmach ............. G01F 15/024
9,581,486 B2 2/2017 Rudroff
9,719,837 B2 8/2017 Rudroff
10,240,967 B2 * 3/2019 Bhatasana ............... G01F 25/11
10,429,230 B2 * 10/2019 Bhatasana ............... G01F 25/10
10,612,685 B2 * 4/2020 Lippert ..................... G01L 9/08
11,193,811 B2 12/2021 Gurevich et al.
11,543,283 B2 * 1/2023 Collister ................. G01F 25/10
11,709,090 B2 * 7/2023 Bhatasana ............... G01F 25/11 702/100
12,066,452 B2 * 8/2024 McBrien .................. G01N 7/00
12,099,093 B2 * 9/2024 Chang ................ G01R 31/3274
2007/0119227 A1 * 5/2007 Moriyama .............. G01F 25/11 73/1.16
2008/0083262 A1 * 4/2008 Augenstein ............. G01F 25/10 73/1.16
2011/0130997 A1 * 6/2011 Day ........................ G01F 25/11 73/1.16
2013/0253872 A1 * 9/2013 Curtis ..................... G01F 25/10 73/1.16
2015/0052968 A1 * 2/2015 Day ........................ G01F 25/11 73/1.19
2022/0390262 A1 * 12/2022 Patten ...................... G01F 1/86

* cited by examiner

300

VALIDATING PERFORMANCE OF A BI-DIRECTIONAL PROVER

TECHNICAL FIELD

This disclosure relates to systems and methods for validating a performance of a bi-directional prover in a fluid flow system.

BACKGROUND

Custody transfer or custody transfer measurement (also known as fiscal metering) is a process and system in which transactions involving the exchange of fluids between entities (such as different hydrocarbon processing or production companies). The transfer process can occur through any chain, for example, ships, tanks, tankers or other hydrocarbon holding apparatus. A component of a hydrocarbon liquid custody transfer measurement system is a bi-directional prover. In operation, the prover constitutes a standard reference to verify proper (and accurate) performance of a flow meter within the hydrocarbon liquid custody measurement system. The flow meter measures an amount of hydrocarbon transferred and, therefore, accuracy of the flow meter operation is critical.

SUMMARY

In an example implementation, a bi-directional prover validation system includes a bi-directional prover that includes a calibration section that includes a fluid conduit that includes a bend section and at least one straight section, a launch section fluidly coupled to a fluid flow system that circulates a process fluid and configured to bi-directionally move a displacer through the fluid conduit, a fluid inlet configured to fluidly couple the fluid conduit to the launch section, and a fluid outlet configured to fluidly couple the fluid conduit to the launch section. The bi-directional prover validation system includes a temperature sensor fluidly coupled in the fluid conduit; a pressure sensor fluidly coupled in the fluid conduit; a densometer fluidly coupled in the fluid conduit; and a control system communicably coupled to the temperature sensor, the pressure sensor, a flow meter, and the densometer. The control system is configured to perform operations including identifying one or more parameters associated with the bi-directional prover; identifying measurements from the temperature sensor, the pressure sensor, and the densometer taken during movement of the displacer through the fluid conduit; based on the identified measurements and the identified one or more parameters, calculating an outlet pressure of the process fluid at the fluid outlet; comparing the calculated outlet pressure to a measured outlet pressure of the process fluid at the fluid outlet; and based on the comparison meeting a threshold, validating the bi-directional prover.

In an aspect combinable with the example implementation, the one or more parameters includes at least one of an inner diameter of the fluid conduit, a friction factor of the fluid conduit, or a liquid drag factor of the process fluid.

In another aspect combinable with any of the previous aspects, the pressure sensor is positioned in the fluid conduit between the fluid inlet and the calibration section.

In another aspect combinable with any of the previous aspects, the operations include determining the measured outlet pressure based on the measured fluid pressure from the pressure sensor and a differential pressure measured by a differential pressure sensor fluidly coupled in the fluid conduit.

In another aspect combinable with any of the previous aspects, the operations include correcting the measured density by the densometer based on the measured temperature by the temperature sensor.

In another aspect combinable with any of the previous aspects, the operations include calculating a viscosity of the process fluid in the fluid conduit based on the corrected density and a velocity of the process fluid in the fluid conduit.

In another aspect combinable with any of the previous aspects, calculating an outlet pressure of the process fluid at the fluid outlet includes executing a conservation of energy equation to determine the outlet pressure.

In another aspect combinable with any of the previous aspects, the operation of executing the conservation energy equation includes comparing an input energy at the fluid inlet to an output energy at the fluid outlet.

In another aspect combinable with any of the previous aspects, the input energy is a sum of a measured fluid pressure of the pressure sensor and an input kinetic energy, and the output energy is a sum of the calculated outlet pressure, an output kinetic energy, a viscous resistance, a friction of the process fluid, and a friction of the fluid conduit.

In another aspect combinable with any of the previous aspects, comparing the input energy at the fluid inlet to the output energy at the fluid outlet includes solving for the actual fluid pressure at the fluid outlet according to $$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the process fluid at the fluid inlet, $\upsilon_i$ is a velocity of the process fluid at the fluid inlet, $\rho_i$ is the density of the process fluid corrected for temperature, $\upsilon_i$ is the velocity of the process fluid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

In another aspect combinable with any of the previous aspects, the operations include, based on the comparison not meeting the threshold, providing an alert.

In another example implementation, a hydrocarbon custody transfer system includes a piping network that includes a flow meter configured to measure a flow rate of a hydrocarbon liquid; and a bi-directional prover fluidly coupled to the piping network and including a calibration section including a fluid conduit that includes a bend section and at least one straight section, a launch section configured to bi-directionally move a displacer with the hydrocarbon liquid through the fluid conduit, a fluid inlet configured to fluidly couple the fluid conduit to the launch section, a fluid outlet configured to fluidly couple the fluid conduit to the launch section, a temperature sensor fluidly coupled in the fluid conduit, a pressure sensor fluidly coupled in the fluid conduit, and a densometer fluidly coupled in the fluid conduit. The hydrocarbon custody transfer system includes a control system communicably coupled to the temperature sensor, the pressure sensor, the flow meter, and the densometer. The control system is configured to perform operations including identifying one or more parameters associated with the bi-directional prover; identifying measurements from the temperature sensor, the pressure sensor, and the densometer taken during movement of the displacer through the fluid conduit; based on the identified measurements and the identified one or more parameters, calculating an outlet pressure of the hydrocarbon liquid at the fluid outlet; comparing the calculated outlet pressure to a measured outlet pressure of the hydrocarbon liquid at the fluid outlet; and based on the comparison meeting a threshold, validating the bi-directional prover.

In an aspect combinable with the example implementation, the one or more parameters includes at least one of an inner diameter of the fluid conduit, a friction factor of the fluid conduit, or a liquid drag factor of the hydrocarbon liquid.

In another aspect combinable with any of the previous aspects, the pressure sensor is positioned in the fluid conduit between the fluid inlet and the calibration section.

In another aspect combinable with any of the previous aspects, the operations include determining the measured outlet pressure based on the measured fluid pressure from the pressure sensor and a differential pressure measured by a differential pressure sensor fluidly coupled in the fluid conduit.

In another aspect combinable with any of the previous aspects, the operations include correcting the measured density by the densometer based on the measured temperature by the temperature sensor.

In another aspect combinable with any of the previous aspects, the operations include calculating a viscosity of the hydrocarbon liquid in the fluid conduit based on the corrected density and a velocity of the hydrocarbon liquid in the fluid conduit.

In another aspect combinable with any of the previous aspects, calculating an outlet pressure of the hydrocarbon liquid at the fluid outlet includes executing a conservation of energy equation to determine the outlet pressure.

In another aspect combinable with any of the previous aspects, the operation of executing the conservation energy equation includes comparing an input energy at the fluid inlet to an output energy at the fluid outlet.

In another aspect combinable with any of the previous aspects, the input energy is a sum of a measured fluid pressure of the pressure sensor and an input kinetic energy, and the output energy is a sum of the calculated outlet pressure, an output kinetic energy, a viscous resistance, a friction of the hydrocarbon liquid, and a friction of the fluid conduit.

In another aspect combinable with any of the previous aspects, comparing the input energy at the fluid inlet to the output energy at the fluid outlet includes solving for the actual fluid pressure at the fluid outlet according to $$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the hydrocarbon liquid at the fluid inlet, $\upsilon_i$ is a velocity of the hydrocarbon liquid at the fluid inlet, $\rho_i$ is the density of the hydrocarbon liquid corrected for temperature, $\upsilon_i$ is the velocity of the hydrocarbon liquid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

In another aspect combinable with any of the previous aspects, the operations include, based on the comparison not meeting the threshold, providing an alert.

In another example implementation, a method of validating a bi-directional prover in a fluid flow system includes operating a bi-directional prover fluidly coupled to a fluid flow system by bi-directionally moving a displacer through a fluid conduit of a calibration section of the prover with a process fluid of the fluid flow system. The fluid conduit includes a fluid inlet coupled to a launch section of the prover, a fluid outlet coupled to the launch section, a bend section, and at least one straight section. The method includes, during operation of the bi-directional prover: measuring a temperature of the process fluid in the fluid conduit, measuring a pressure of the process fluid in the fluid conduit, and measuring a density of the process fluid in the fluid conduit. The method include identifying, with a control system, one or more parameters associated with the bi-directional prover; based on the measured temperature, pressure, and density and the identified one or more parameters, calculating, with the control system, an outlet pressure of the process fluid at the fluid outlet; comparing, with the control system, the calculated outlet pressure to a measured outlet pressure of the process fluid at the fluid outlet; and based on the comparison meeting a threshold, generating an alert with the control system that validates the bi-directional prover.

In an aspect combinable with the example implementation, the one or more parameters includes at least one of an inner diameter of the fluid conduit, a friction factor of the fluid conduit, or a liquid drag factor of the hydrocarbon liquid.

Another aspect combinable with any of the previous aspects includes determining, with the control system, the measured outlet pressure based on the measured pressure from a pressure sensor positioned in the fluid conduit and a differential pressure measured by a differential pressure sensor fluidly coupled in the fluid conduit.

Another aspect combinable with any of the previous aspects includes correcting, with the control system, the measured density based on the measured temperature.

Another aspect combinable with any of the previous aspects includes calculating, with the control system, a viscosity of the process fluid in the fluid conduit based on the corrected density and a velocity of the hydrocarbon liquid in the fluid conduit.

In another aspect combinable with any of the previous aspects, calculating an outlet pressure of the hydrocarbon liquid at the fluid outlet includes executing, with the control system, a conservation of energy equation to determine the outlet pressure.

In another aspect combinable with any of the previous aspects, executing the conservation energy equation includes comparing, with the control system, an input energy at the fluid inlet to an output energy at the fluid outlet.

In another aspect combinable with any of the previous aspects, the input energy is a sum of a measured fluid pressure of the pressure sensor and an input kinetic energy, and the output energy is a sum of the calculated outlet pressure, an output kinetic energy, a viscous resistance, a friction of the hydrocarbon liquid, and a friction of the fluid conduit.

In another aspect combinable with any of the previous aspects, comparing the input energy at the fluid inlet to the output energy at the fluid outlet includes solving, with the control system, for the actual fluid pressure at the fluid outlet according to $$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the hydrocarbon liquid at the fluid inlet, $\upsilon_i$ is a velocity of the hydrocarbon liquid at the fluid inlet, $\rho_i$ is the density of the hydrocarbon liquid corrected for temperature, $\upsilon_i$ is the velocity of the hydrocarbon liquid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

Another aspect combinable with any of the previous aspects includes, based on the comparison not meeting the threshold, providing a warning alert with the control system.

Implementations of prover validation systems and methods according to the present disclosure may also include one or more of the following features. For example, implementations according to the present disclosure can provide for advanced detection of partial deterioration and full damage to a prover displacer. As another example, implementations according to the present disclosure can provide for advanced detection of major damages to prover pipe walls. Further, implementations according to the present disclosure can provide a digital solution to minimize operation interruptions and maximize availability of a bi-directional prover. Also, implementations according to the present disclosure can provide a performance-based inspection system for a bi-directional prover and prover displacer. Further, implementations according to the present disclosure can provide for verification of prover displacer sizing and material selection.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
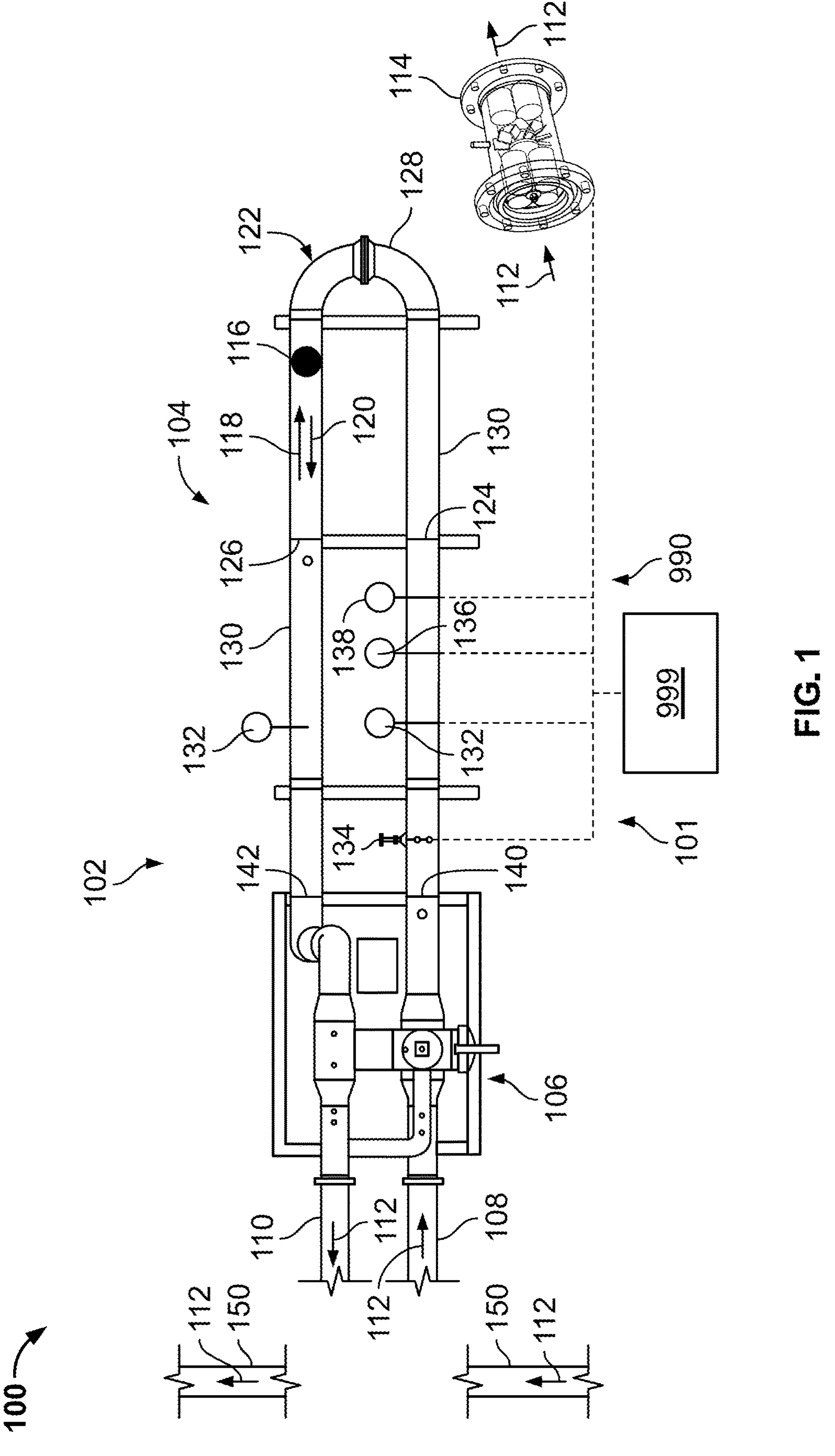
FIG. 1 is a schematic illustration of an example implementation of a bi-directional prover in a fluid flow system that includes a prover validation assembly according to the present disclosure.

The present disclosure describes example implementations of apparatus, systems, and method for validating a bi-directional prover ("prover") in a fluid flow system, for example, validating operation and accuracy of the prover, which in turn, for instance, validates the accuracy of a flow meter in the system. The fluid flow system can be a hydrocarbon liquid custody measurement system. In some aspects, implementations according to the present disclosure can validate and indicate a performance of the prover and, if applicable, cause of failure based on online and continuous analysis of an actual process parameters without the need to fluidly isolate the prover within the fluid flow system.

In bi-directional provers, pressure drop across the prover (between the inlet and the outlet, which are both coupled within the fluid flow system) can be caused by a displacer that travels along the prover section in a fit-tight position. The displacer is often a ball or sphere and creates a sealing condition between an inside conduit wall and the displacer itself. This pressure drop depends on multiple factors such as the proving flow rate, displacer inflation, viscous resistance, fluid displacement friction, pipe friction, density, and viscosity of the process fluid in the fluid flow system.

Implementations according to the present disclosure utilize process parameters to calculate a pressure drop at an outlet of the prover and compare this value to a measured pressure at the outlet of the prover. Actual pressure can be measured by pressure transmitters installed at an inlet and the outlet of the prover, with pressure measurements, in some aspects, being provided to a control system or controller. The control system can utilize process parameters including flow meter measurements, fluid density, fluid viscosity, fluid temperature, and detector switches to calculate a predicted pressure at the outlet of the prover (which is compared to the measured pressure.) If the bi-directional prover is operating properly (and therefore, validated), then the measured and calculated pressure at the outlet should be equal or substantially equal (for example, within a predetermined percentage difference).

If the bi-directional prover is not validated, the control system, in some aspects, can perform multiple calculation scenarios to recalculate the outlet pressure based on simulated process condition to identify a cause of the improper operation and provide a feedback on a cause of prover failure.

In example implementations according to the present disclosure, the control system of the prover validation system (or assembly) can utilize the conservation of energy equation and historical pressure drop value for different process parameters to provide a predictive performance analysis of the prover's displacer when the differential pressure readings across the prover are less than the expected range. If such different pressure readings are less than an expected range, the control system can provide an alert of possible problems with predictive cause(s) of the problem based on simulated process conditions to identify the cause and provide a feedback on what has change in the prover to indicate the reason of prover failure. Thus, based on the alert and feedback physical inspection of the prover can commence but be based on technical calculations and predetermined reasons rather than conventional troubleshooting procedures.

FIG. 1 is a schematic illustration of an example implementation of a bi-directional prover 102 in a fluid flow system 100 that includes a prover validation assembly 101 according to the present disclosure. In some aspects, the fluid flow system 100 (not all of which is shown) can be a hydrocarbon liquid custody measurement system. In this example, the fluid flow system 100 includes a piping network 150 through which a process fluid 112 flows. The process fluid 112 can be, for example, a hydrocarbon fluid (such as oil or mixed phase flow). Piping stubs 108 and 110 fluidly connect the bi-directional prover 102 with the fluid flow system 100 so that the process fluid 112 can be re-routed through the bi-directional prover 102 (through operation of one or more valves of the fluid flow system 100 or a launch section 106 of the bi-directional prover 102). As further shown, a flow meter 114 is positioned in the fluid flow system 100 to measure a volumetric flow rate of the process fluid 112.

The bi-directional prover 102, in this example, works as a standard reference to verify the performance of the flow meter 114. The concept of the bi-directional prover 102 is that the same amount of process fluid 112 that passes through the flow meter 114 will also pass through a calibrated and known volume of a calibration section 104 of the bi-directional prover 102, thereby ensuring accuracy of the flow meter 114.

As shown in this example, the calibrated section 104 includes a fluid inlet 140 coupled to the launch section 106, as well as a fluid outlet 142 coupled to the launch section 106. However, the fluid inlet 140 and fluid outlet 142 are interchangeable as inlets and outlets as the process is bidirectional. In a normal operation of the bi-directional prover 102, a displacer 116 (such as a spherical member or ball) is moved bi-directionally through a fluid conduit 122 of the calibrated section 104 with a flow of the process fluid 112 (and into the launch section 106, which operates to not only initiate movement of the displacer 116, but also switch directional movement of the displacer 116 through the fluid conduit 122 in a first direction 118 and a second direction 120).

As shown in FIG. 1, the fluid conduit 122 includes a bend section 128 and straight sections 130 (that couple the bend section 128 to the fluid inlet 140 and the fluid outlet 142). During operation, the calibrated section 104 is defined by two end-points 124 and 126 where a start/stop trigger switch is installed at each end-point. The trigger switches are initiated by the displacer 116, which is enclosed within the fluid conduit 122. When the calibrated section 104 is operating correctly (in other words, validated), the displacer 116 provides proper sealing within the fluid conduit 122 to prevent the process fluid 112 (which provides the motive force for the displacer 116) from passing between its surface and the internal wall of the fluid conduit 122. As the flow of the process fluid 112 passes through both the flow meter 114 and the bi-directional prover 102, the displacer 116 is pushed by the liquid flow to ensure that the same amount of process fluid 112 passes through both the flow meter 114 and prover's calibrated section 104.

Desirably, and to ensure accurate performance verification of the flow meter 114 through this proving process, the displacer 116 should or must obtain full sealing between it and the internal wall of the fluid conduit 122. To ensure such condition, the displacer 116 should be maintained in a specific design criteria and physical condition. However, as the displacer 116 moves back and forward through the fluid conduit 122, the displacer 116 experiences wear and tear that changes its condition. This impacts the accuracy of the proving process and could lead to a failure of the bi-directional prover 102, thereby resulting in disruption of flow measurement operation.

In some aspects, a proving operation (in other words, normal operation of the bi-directional prover 102) activates the bi-directional prover 102 a minimum number of bi-directional passes of the displacer 116 in the fluid conduit 122 (such as, for example, at least 8 passes). Due to the number of passes, the displacer 116 can be the subject to frequent failures and can require high maintenance and frequent physical inspection leading to frequent extended outages of operation of the bi-directional prover 102. Whenever the bi-directional prover 102 fails, operation and maintenance have to go through blind troubleshooting procedures to identify the cause. This process is lengthy and impose safety concerns. In many cases, the procedure has to be repeated until the issue is resolved.

Indeed, one of the most common reasons for failure of the bi-directional prover 102 is a damaged displacer 116. To maintain the displacer 116 in the required condition, it is periodically inspected physically by removing it out of the bi-directional prover 102. However, this process itself disturbs the operation of the bi-directional prover 102. However, the prover validation assembly 101 of the present disclosure can prevent or help prevent the need to periodically remove or inspect the displacer 116.

In the example implementation, the prover validation assembly 101 includes a densometer 134, as well as a pressure sensor 136 and a temperature sensor 138, each of which is mounted in the fluid conduit 122 between the fluid inlet 140 and the bend section 128. As further shown in this example implementation, a differential pressure sensor 132 is mounted across the bend section 128 (in the two straight sections 130) to measure a differential pressure between the fluid inlet 140 and the fluid outlet 142.

The prover validation assembly 101 further includes a control system 999 that communicates to the densometer 134, the pressure sensor 136, the temperature sensor 138, the differential pressure sensor 132, and (optionally) the flow meter 114 through (wired or wireless) signals 990. The signals 990, generally provide the control system 999 with measurements of the process fluid 112 during operation of the bi-directional prover 102 (such as fluid density, fluid pressure, fluid temperature, fluid differential pressure, and fluid volumetric flow rate). The control system 999 can further store or reference parameters of the bi-directional prover 102, such as geometric and material criteria of the fluid conduit 122, as well as properties of the process fluid 112 (such as fluid friction factors).

In some aspects, one or more components of the prover validation assembly 101 and other components of the bi-directional prover 102 are conventional components of a bi-directional prover 102. For instance, the prover validation assembly 101 capitalizes on the existing displacer 116 and detector switches (at points 124 and 126) of the bi-directional prover 102; with the addition of a set of pressure transmitters (the pressure sensor 136 and differential pressure sensor 132), a temperature transmitter (the temperature sensor 138), and a logic solver as part of the control system 999 that operates to implement one or more algorithms according to the present disclosure.

As described, the displacer 116 is set as a tight fit inside the fluid conduit 122, and as it moves along the calibration section 104, the displacer 116 creates a pressure drop between the fluid inlet 140 and the fluid outlet 142. The differential pressure created by the displacer 116 represents a difference in pressure upstream and downstream of the moving displacer 116 as the displacer 116 moves tightly inside the fluid conduit 122. The pressure difference depends on multiple factors such as the flow rate of the process fluid 112, sphere inflation of the displacer 116, and other process parameters. Based on these factors, there will be a range of acceptable pressure differences across the calibrated section 104 that indicate if the displacer 116 is providing a positive seal, and hence, the flow meter proving operation will be successful.

In some aspects, the control system 999 utilizes historical differential pressure values for certain process parameters to provide a predictive performance analysis of the prover's displacer 116. Therefore, when the differential pressure readings across the calibrated section 104 are less than the expected range, the control system 999 outputs an alert (for example, to an operator) that the displacer 116 is damaged. Therefore, the control system 999 can predict any deterioration in the displacer 116 that may lead to the failure of meter proving operation before it happens. Accordingly, the prover availability increases, planned performance-based maintenance activity is enabled, and operation distribution due to unpredictive displacer failure can be avoided.

Moreover, the reason of unsuccessful proving due to damage displacer will be confirmed with certainty before isolating the prover, take it out of service, and retracting the displacer for inspection. This process can eliminate random prover isolation to randomly inspect the displacer 116 whenever there is unsuccessful proving. Alternatively, the control system 999 can perform online analysis utilizing the differential pressure across the calibration section 104 with associated operation parameters to raise advance analytical technical recommendation to retract the displacer 116 only when needed. In addition, the out-of-limit pressure difference can be an interpretation, by the control system 999, of another common cause of unsuccessful proving which is rough pipe wall surface of the fluid conduit 122. As a result, unnecessary retraction of the displacer 116 can be eliminated.

Figure 2:
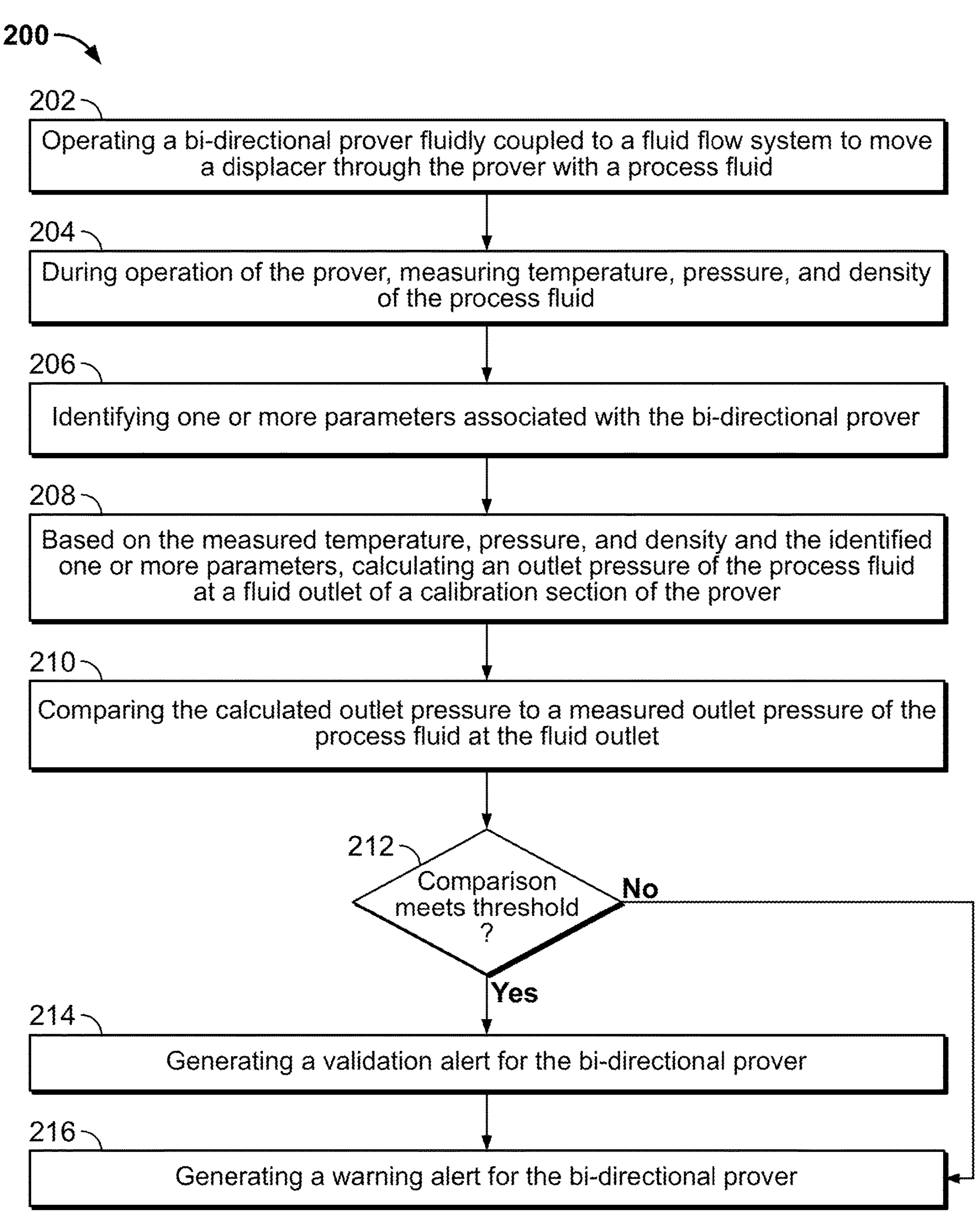
FIG. 2 is a flowchart of an example method of validating a bi-directional prover in a fluid flow system according to the present disclosure.

FIG. 2 is a flowchart of an example method 200 of validating a bi-directional prover in a fluid flow system according to the present disclosure. Method 200, in some examples, can be implemented with the bi-directional prover 102 and, more specifically, the prover validation assembly 101 including the control system 999. For example, one or more steps of the method 200 can be implemented by or with the control system 999.

Method 200 can begin at step 202, which includes operating a bi-directional prover fluidly coupled to a fluid flow system to move a displacer through the prover with a process fluid. For example, the bi-directional prover 102 can be operated by circulating a flow of the process fluid 112 into the launch section 106, which, in turn, fluidly moves the displacer 116 through the calibrated section 104. The displacer 116 can be repeatedly moved (through operation of the launch section 106) through the fluid conduit 122 between the fluid inlet 140 and the fluid outlet 142. Each pass of the displacer 116, trigger switches at end points 124 and 126 can be tripped so that a measured amount of flow of the process fluid 112 within the calibration section 104 can be compared against a measured amount of flow by the flow meter 114. In such fashion, the flow meter 114 can be checked for accuracy.

Method 200 can continue at step 204, which includes, during operation of the prover, measuring temperature, pressure, and density of the process fluid. For example, as the displacer 116 is moving in the fluid conduit 122, the pressure sensor 136 can measure a fluid pressure of the process fluid 112 at or near the fluid inlet 140. The temperature sensor 138 can measure fluid temperature of the process fluid 112 at or near the fluid inlet 140. The densometer 134 can measure a fluid density of the process fluid 112 at or near the fluid inlet 140. These measurements can be provided through signals 990 to the control system 999. In some aspects, the control system 999 can correct the measured fluid density according to the measured temperature. In some aspects, step 204 can also include a calculation (for example, by the control system 999) of the fluid viscosity (for example, temperature compensated viscosity).

Method 200 can continue at step 206, which includes identifying one or more parameters associated with the bi-directional prover. For example, the control system 999 can store certain attributes of the fluid conduit 122, such as length of the straight sections 130, pipe friction factor of the fluid conduit 122, and dimensions (for example, radius or diameter) of the displacer 116. Other parameters, such as fluid parameters of the process fluid 112 like fluid friction can be stored or referenced by the control system 999.

Method 200 can continue at step 208, which includes, based on the measured temperature, pressure, and density and the identified one or more parameters, calculating an outlet pressure of the process fluid at a fluid outlet of a calibration section of the prover. For example, in some aspects, the calculated outlet pressure (for example, fluid pressure at fluid outlet 142) can be determined with reference to a conservation of energy equation. The conservation of energy equation can be executed by the control system 999 by comparing an input energy at the fluid inlet 140 to an output energy at the fluid outlet 142. Generally, the input energy is a sum of the measured fluid pressure of the pressure sensor 136 and an input kinetic energy, while the output energy is a sum of the calculated outlet pressure, an output kinetic energy, a viscous resistance, a friction of the process fluid 112, and a friction of the fluid conduit 122. This equation can be expressed as:

$$\text{Pressure}_1 + \text{Kinetic Energy}_1 = \text{Pressure}_2 + \text{Kinetic Energy}_1 + \text{Viscous Resistance} + \text{Fluid Friction} + \text{Pipe Friction}, \quad \text{Eq. 1}$$

In Eq. 1, the subscript 1 refers to equation components taken at the fluid inlet 140, while the subscript 2 refers to equation components taken at the fluid outlet 142.

The kinetic energy, viscous resistance, friction of the process fluid 112, and friction of the fluid conduit 122 can be expanded as follows:

$$\text{Pressure}_1 + \left(\frac{1}{2}\rho_1 v_1^2\right) = \text{Pressure}_2 + \left(\frac{1}{2}\rho_2 v_2^2\right) + (-6\pi r n v_2) + \left(f_F \frac{L}{D}\frac{v_2^2}{2g}\right) + \left(f_S \frac{L}{D}\frac{v_2^2}{2g}\right). \quad \text{Eq. 2}$$

In Eq. 2, $\text{Pressure}_2$ is the calculated outlet pressure, $\text{Pressure}_1$ is the measured fluid pressure of the pressure sensor 136, $\rho_1$ is the measured density of the process fluid 112 at the fluid inlet 140, $\upsilon_1$ is a velocity of the process fluid 112 at the fluid inlet 140, $\rho_2$ is the density of the process fluid 112 corrected for temperature, $\upsilon_i$ is the velocity of the process fluid at the fluid outlet, r is a radius of the displacer 116, L is a length of straight section 130, D is an inner diameter of the fluid conduit 122, $f_F$ is a fluid friction constant, $f_s$ is a pipe friction constant, n is fluid viscosity, and g is acceleration due to gravity.

Eq. 2 can be rearranged to solve for $\text{Pressure}_2$ as follows:

$$\text{Pressure}_2 = \text{Pressure}_1 + \left(\frac{1}{2}\rho_1 v_1^2\right) - \left(\frac{1}{2}\rho_2 v_2^2\right) + (-6\pi r n v_2) + \left(f_F \frac{L}{D}\frac{v_2^2}{2g}\right) + \left(f_S \frac{L}{D}\frac{v_2^2}{2g}\right). \quad \text{Eq. 3}$$

Thus, step 208 includes solving for $\text{Pressure}_2$, which is the calculated outlet pressure at the fluid outlet 142.

Method 200 can continue at step 210, which includes comparing the calculated outlet pressure to a measured outlet pressure of the process fluid at the fluid outlet. For example, the measured outlet pressure can be determined by measurements taken by the fluid pressure 136 and the differential pressure sensor 132. Once this measurement is taken and conveyed to the control system 999, it can be compared to the calculated outlet pressure of step 208.

Method 200 can continue at step 212, which includes a determination of whether the comparison meets a threshold value. For example, the threshold value can be an exact match between the calculated outlet pressure and the measured outlet pressure or, if not an exact match, a difference within a particular plus-minus range (for example, 0-0.1%, 0.1-1.0%, 1-10%, or other acceptable range). The closer the match between the calculated outlet pressure and the measured outlet pressure can mean that the bi-directional prover 102 is operating properly.

If the determination in step 212 is yes, then method 200 can continue at step 214, which includes generating a validation alert for the bi-directional prover. For example, if the comparison is close enough to a match to satisfy the threshold value, then the control system 999 can generate an alert that validates the bi-directional prover 102 (for example, alerts an operator that the bi-directional prover 102 is working properly).

If the determination in step 212 is no, then method 200 can continue at step 216, which includes generating a warning alert for the bi-directional prover. For example, if the comparison is not close enough to a match to satisfy the threshold value, then the control system 999 can generate an alert that, for example, instructs an operator to physically inspect the displacer 116 for wear or other damage. Other alerts can also be generated for the operator. For example, an alert can instruct the operator to: verify flow rate meter reading from the flow meter 114, verify a time detector switch of the bi-directional prover 102, verify the densometer 134, verify a viscosity of the process fluid 112, verify a displacer detector switch (or trigger, at one or both of points 124 and 126), verify displacer friction ($f_s$) (through inspection), verify a diameter of the displacer 116 ($f_F$), and/or verify a pipe friction ($f_s$) of the fluid conduit 122 (through inspection).

Figure 3:
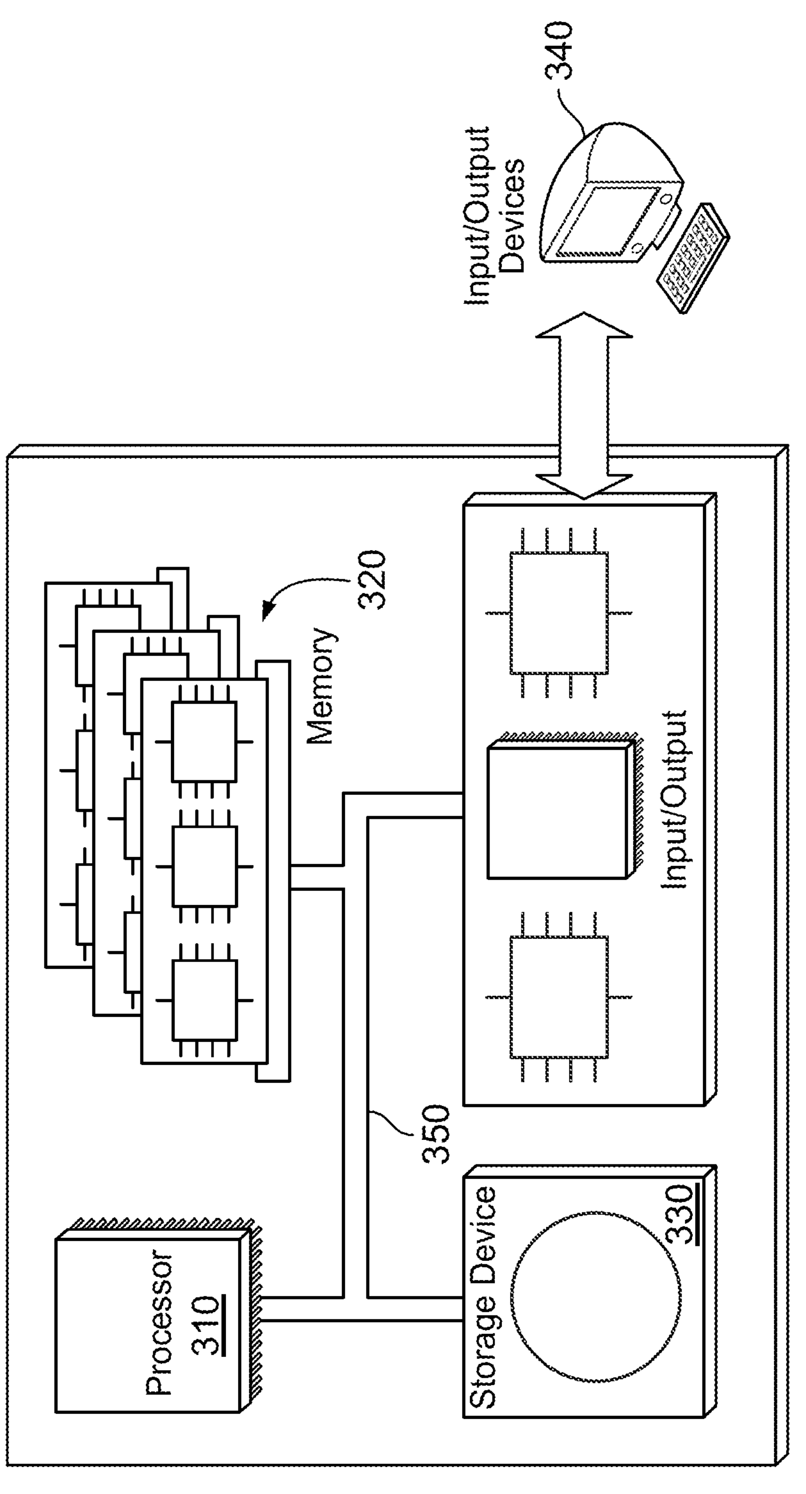
FIG. 3 is a schematic illustration of a controller or control system for a prover validation assembly according to the present disclosure.

FIG. 3 is a schematic illustration of an example controller 300 (or control system) for a fluid processing system. For example, the controller 300 can be used for the operations described previously, for example as or as part of the control system 999. For example, the controller 300 may be communicably coupled with, or as a part of, a prover validation assembly as described herein.

The controller 300 is intended to include various forms of digital computers, such as printed circuit boards (PCB), processors, digital circuitry, or otherwise that is part of a vehicle. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340. Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the controller 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, a tape device, flash memory, a solid state device (SSD), or a combination thereof.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A bi-directional prover validation system, comprising:
a bi-directional prover, comprising:
a calibration section that comprises a fluid conduit that includes a bend section and at least one straight section,
a launch section fluidly coupled to a fluid flow system that circulates a process fluid and configured to bi-directionally move a displacer through the fluid conduit,
a fluid inlet configured to fluidly couple a first end of the fluid conduit to the launch section, and
a fluid outlet configured to fluidly couple a second end of the fluid conduit to the launch section;
a temperature sensor fluidly coupled in the fluid conduit;
a pressure sensor fluidly coupled in the fluid conduit;
a densometer fluidly coupled in the fluid conduit; and
a control system communicably coupled to the temperature sensor, the pressure sensor, a flow meter, and the densometer and configured to perform operations comprising:
identifying one or more parameters that is stored in the control system and is associated with the bi-directional prover;
identifying measurements from the temperature sensor, the pressure sensor, and the densometer taken during movement of the displacer through the fluid conduit;
based on the identified measurements and the identified one or more parameters, calculating an outlet pressure of the process fluid at the fluid outlet;
comparing the calculated outlet pressure to a measured outlet pressure, from the pressure sensor, of the process fluid at the fluid outlet; and
based on the comparison meeting a threshold, validating the bi-directional prover.

2. The bi-directional prover validation system of claim 1, wherein the one or more parameters comprises at least one of an inner diameter of the fluid conduit, a friction factor of the fluid conduit, or a liquid drag factor of the process fluid.

3. The bi-directional prover validation system of claim 1, wherein the pressure sensor is positioned in the fluid conduit between the fluid inlet and the bend section of the calibration section, and the operations comprise:
determining the measured outlet pressure based on the measured fluid pressure from the pressure sensor and a differential pressure measured by a differential pressure sensor fluidly coupled in the fluid conduit in the fluid inlet and the fluid outlet and across the bend section of the calibration section.

4. The bi-directional prover validation system of claim 1, wherein the operations comprise correcting the measured density by the densometer based on the measured temperature by the temperature sensor.

5. The bi-directional prover validation system of claim 4, wherein the operations comprise calculating a viscosity of the process fluid in the fluid conduit based on the corrected density and a velocity of the process fluid in the fluid conduit.

6. The bi-directional prover validation system of claim 1, wherein calculating an outlet pressure of the process fluid at the fluid outlet comprises executing a conservation of energy equation to determine the outlet pressure.

7. The bi-directional prover validation system of claim 6, wherein the operation of executing the conservation energy equation comprises:

comparing an input energy at the fluid inlet to an output energy at the fluid outlet.

8. The bi-directional prover validation system of claim 7, wherein the input energy is a sum of a measured fluid pressure of the pressure sensor and an input kinetic energy, and the output energy is a sum of the calculated outlet pressure, an output kinetic energy, a viscous resistance, a friction of the process fluid, and a friction of the fluid conduit.

9. The bi-directional prover validation system of claim 8, wherein comparing the input energy at the fluid inlet to the output energy at the fluid outlet comprises solving for the actual fluid pressure at the fluid outlet according to:

$$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the process fluid at the fluid inlet, $\upsilon_i$ is a velocity of the process fluid at the fluid inlet, $\rho_i$ is the density of the process fluid corrected for temperature, $\upsilon_i$ is the velocity of the process fluid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

10. The bi-directional prover validation system of claim 1, wherein the operations comprise, based on the comparison not meeting the threshold, providing an alert.

11. A hydrocarbon custody transfer system, comprising:

a piping network that comprises a flow meter configured to measure a flow rate of a hydrocarbon liquid;

a bi-directional prover fluidly coupled to the piping network, the bi-directional prover comprising:

a calibration section comprising a fluid conduit that includes a bend section and at least one straight section, a launch section configured to bi-directionally move a displacer with the hydrocarbon liquid through the fluid conduit, a fluid inlet configured to fluidly couple a first end of the fluid conduit to the launch section, a fluid outlet configured to fluidly couple a second end of the fluid conduit to the launch section, a temperature sensor fluidly coupled in the fluid conduit, a pressure sensor fluidly coupled in the fluid conduit, and a densometer fluidly coupled in the fluid conduit; and a control system communicably coupled to the temperature sensor, the pressure sensor, the flow meter, and the densometer and configured to perform operations comprising:

identifying one or more parameters that is stored in the control system and is associated with the bi-directional prover;

identifying measurements from the temperature sensor, the pressure sensor, and the densometer taken during movement of the displacer through the fluid conduit;

based on the identified measurements and the identified one or more parameters, calculating an outlet pressure of the hydrocarbon liquid at the fluid outlet;

comparing the calculated outlet pressure to a measured outlet pressure, from the pressure sensor, of the hydrocarbon liquid at the fluid outlet; and based on the comparison meeting a threshold, validating the bi-directional prover.

12. The hydrocarbon custody transfer system of claim 11, wherein the one or more parameters comprises at least one of an inner diameter of the fluid conduit, a friction factor of the fluid conduit, or a liquid drag factor of the hydrocarbon liquid.

13. The hydrocarbon custody transfer system of claim 11, wherein the pressure sensor is positioned in the fluid conduit between the fluid inlet and the bend section of the calibration section, and the operations comprise:

determining the measured outlet pressure based on the measured fluid pressure from the pressure sensor and a differential pressure measured by a differential pressure sensor fluidly coupled in the fluid conduit in the fluid inlet and the fluid outlet and across the bend section of the calibration section.

14. The hydrocarbon custody transfer system of claim 11, wherein the operations comprise correcting the measured density by the densometer based on the measured temperature by the temperature sensor.

15. The hydrocarbon custody transfer system of claim 14, wherein the operations comprise calculating a viscosity of the hydrocarbon liquid in the fluid conduit based on the corrected density and a velocity of the hydrocarbon liquid in the fluid conduit.

16. The hydrocarbon custody transfer system of claim 11, wherein calculating an outlet pressure of the hydrocarbon liquid at the fluid outlet comprises executing a conservation of energy equation to determine the outlet pressure.

17. The hydrocarbon custody transfer system of claim 16, wherein the operation of executing the conservation energy equation comprises:

comparing an input energy at the fluid inlet to an output energy at the fluid outlet.

18. The hydrocarbon custody transfer system of claim 17, wherein the input energy is a sum of a measured fluid pressure of the pressure sensor and an input kinetic energy, and the output energy is a sum of the calculated outlet pressure, an output kinetic energy, a viscous resistance, a friction of the hydrocarbon liquid, and a friction of the fluid conduit.

19. The hydrocarbon custody transfer system of claim 18, wherein comparing the input energy at the fluid inlet to the output energy at the fluid outlet comprises solving for the actual fluid pressure at the fluid outlet according to:

$$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the hydrocarbon liquid at the fluid inlet, $\upsilon_i$ is a velocity of the hydrocarbon liquid at the fluid inlet, $\rho_i$ is the density of the hydrocarbon liquid corrected for temperature, $\upsilon_i$ is the velocity of the hydrocarbon liquid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

20. The hydrocarbon custody transfer system of claim 11, wherein the operations comprise, based on the comparison not meeting the threshold, providing an alert.

21. A method of validating a bi-directional prover in a fluid flow system, comprising:

operating a bi-directional prover fluidly coupled to a fluid flow system by bi-directionally moving a displacer through a fluid conduit of a calibration section of the prover with a process fluid of the fluid flow system, the fluid conduit comprising a fluid inlet coupled to a launch section of the prover, a fluid outlet coupled to the launch section, a bend section, and at least one straight section, during operation of the bi-directional prover:

measuring a temperature of the process fluid with a temperature sensor positioned in the fluid conduit, measuring a pressure of the process fluid at the fluid outlet of the fluid conduit with a pressure sensor positioned in the fluid conduit, and measuring a density of the process fluid with a densometer positioned in the fluid conduit;

identifying, with a control system, one or more parameters associated with the bi-directional prover stored in the control system;

based on the measured temperature, pressure, and density and the identified one or more parameters, calculating, with the control system, an outlet pressure of the process fluid at the fluid outlet;

comparing, with the control system, the calculated outlet pressure to the measured outlet pressure of the process fluid at the fluid outlet; and based on the comparison meeting a threshold, generating an alert with the control system that validates the bi-directional prover.

22. The method of claim 21, wherein the one or more parameters comprises at least one of an inner diameter of the fluid conduit, a friction factor of the fluid conduit, or a liquid drag factor of the hydrocarbon liquid.

23. The method of claim 21, comprising:

determining, with the control system, the measured outlet pressure based on the measured pressure from the pressure sensor positioned in the fluid conduit between the fluid inlet and the bend section of the calibration section and a differential pressure measured by a differential pressure sensor fluidly coupled in the fluid conduit in the fluid inlet and the fluid outlet and across the bend section of the calibration section.

24. The method of claim 21, comprising correcting, with the control system, the measured density based on the measured temperature.

25. The method of claim 24, comprising calculating, with the control system, a viscosity of the process fluid in the fluid conduit based on the corrected density and a velocity of the hydrocarbon liquid in the fluid conduit.

26. The method of claim 21, wherein calculating an outlet pressure of the hydrocarbon liquid at the fluid outlet comprises executing, with the control system, a conservation of energy equation to determine the outlet pressure.

27. The method of claim 26, wherein executing the conservation energy equation comprises comparing, with the control system, an input energy at the fluid inlet to an output energy at the fluid outlet.

28. The method of claim 27, wherein the input energy is a sum of a measured fluid pressure of the pressure sensor and an input kinetic energy, and the output energy is a sum of the calculated outlet pressure, an output kinetic energy, a viscous resistance, a friction of the hydrocarbon liquid, and a friction of the fluid conduit.

29. The method of claim 28, wherein comparing the input energy at the fluid inlet to the output energy at the fluid outlet comprises solving, with the control system, for the actual fluid pressure at the fluid outlet according to:

$$P_o = P_i + \left(\frac{1}{2}\rho_i v_i^2\right) - \left(\frac{1}{2}\rho_o v_o^2\right) - (-6\pi r n v_o) - \left(f_F \frac{L}{D}\frac{v_o^2}{2g}\right) - \left(f_s \frac{L}{D}\frac{v_o^2}{2g}\right),$$

where $P_o$ is the calculated outlet pressure, $P_i$ is the measured fluid pressure of the pressure sensor, $\rho_i$ is the measured density of the hydrocarbon liquid at the fluid inlet, $\upsilon_i$ is a velocity of the hydrocarbon liquid at the fluid inlet, $\rho_i$ is the density of the hydrocarbon liquid corrected for temperature, $\upsilon_i$ is the velocity of the hydrocarbon liquid at the fluid outlet, r is a radius of the displacer, L is a length of the at least one straight section, D is an inner diameter of the fluid conduit, $f_F$ is a fluid friction constant, $f_s$ is a pipe friction constant, n is a fluid viscosity, and g is acceleration due to gravity.

30. The method of claim 21, comprising, based on the comparison not meeting the threshold, providing a warning alert with the control system.

* * * * *